(12) United States Patent
Ogasawara et al.

(10) Patent No.: US 9,376,510 B2
(45) Date of Patent: Jun. 28, 2016

(54) EMULSIFYING AGENT FOR EMULSION POLYMERIZATION

(71) Applicants: Asako Ogasawara, Kyoto (JP); Masayuki Hashimoto, Kyoto (JP)

(72) Inventors: Asako Ogasawara, Kyoto (JP); Masayuki Hashimoto, Kyoto (JP)

(73) Assignee: DAI-ICHI KOGYO SEIYAKU CO., LTD., Kyoto (JP)

(*) Notice: Subject to any disclaimer, the term of this patent is extended or adjusted under 35 U.S.C. 154(b) by 65 days.

(21) Appl. No.: 14/352,085

(22) PCT Filed: Sep. 18, 2012

(86) PCT No.: PCT/JP2012/073772
§ 371 (c)(1),
(2) Date: Apr. 16, 2014

(87) PCT Pub. No.: WO2013/058046
PCT Pub. Date: Apr. 25, 2013

(65) Prior Publication Data
US 2014/0243552 A1 Aug. 28, 2014

(30) Foreign Application Priority Data
Oct. 20, 2011 (JP) .................. 2011-230981

(51) Int. Cl.
C08F 2/30 (2006.01)
C08F 2/26 (2006.01)
C08F 2/24 (2006.01)
C08F 290/06 (2006.01)

(52) U.S. Cl.
CPC ... *C08F 2/30* (2013.01); *C08F 2/24* (2013.01); *C08F 2/26* (2013.01); *C08F 290/062* (2013.01)

(58) Field of Classification Search
CPC ........................................................ C08F 2/30
USPC ................................................................ 562/8
See application file for complete search history.

(56) References Cited

U.S. PATENT DOCUMENTS

| 4,640,849 A | 2/1987 | Woods et al. |
| 5,620,796 A | 4/1997 | Kawabata et al. |
| 2007/0049687 A1 | 3/2007 | Hashimoto et al. |

FOREIGN PATENT DOCUMENTS

| EP | 0 232 143 | 8/1987 |
| EP | 1 760 095 | 3/2007 |
| JP | 62-240304 | 10/1987 |
| JP | 63-183998 | 7/1988 |
| JP | 63-319035 | 12/1988 |
| JP | 64-067236 | 3/1989 |
| JP | 4-050204 | 2/1992 |
| JP | 7-278233 | 10/1995 |
| JP | 8-041113 | 2/1996 |
| JP | 11-349612 | 12/1999 |
| JP | 2000-319307 | 11/2000 |
| JP | 2006-075808 | 3/2006 |
| JP | 2007-186624 A | * 7/2007 |

OTHER PUBLICATIONS

Machine translation for JP2000319307.*
Machine translation JP 2007186624.*
International Search Report for PCT/JP2012/073772, dated Oct. 30, 2012.
Chinese Office Action, dated Feb. 4, 2015, for Chinese Patent Application No. 201280051789.2, and English translation thereof.
Extended European Search Report issued Oct. 9, 2015 in corresponding European Application No. 12841795.3.

* cited by examiner

*Primary Examiner* — Scarlett Good
*Assistant Examiner* — Ana Z Muresan
(74) *Attorney, Agent, or Firm* — Wenderoth Lind & Ponack, L.L.P.

(57) ABSTRACT

A reactive emulsifier comprising a compound of formula (I), which makes polymerization stability satisfactory and is capable of improving the water resistance etc. of the polymer film to be obtained.

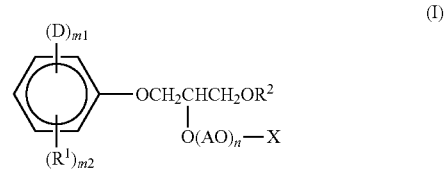

(I)

In the formula (I), D represents a polymerizable unsaturated group represented by the chemical formula D-1 or D-2; m1 represents a number of 1 or larger; $R^1$ represents an alkyl group having 1 to 12 carbon atoms; m2 represents a number of 0 to 4; and the sum of m1 and m2 is 1 to 5. $R^2$ represents a hydrocarbon group having 6 to 30 carbon atoms; A represents either an alkylene group or a substituted alkylene group which has 2 to 4 carbon atoms; and n is in the range of 0 to 1,000. X represents a hydrogen atom or an anionic hydrophilic group which is $-(CH_2)_a-SO_3M$ etc.

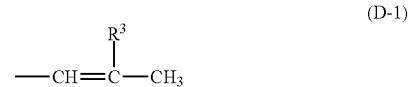

(D-1)

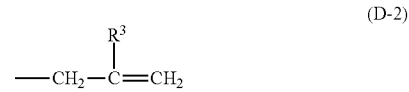

(D-2)

$R^3$ represents a hydrogen atom or methyl.

6 Claims, No Drawings

EMULSIFYING AGENT FOR EMULSION POLYMERIZATION

TECHNICAL FIELD

The present invention relates to an emulsifier for use in emulsion polymerization processes. More particularly, the present invention relates to an emulsifier for emulsion polymerization which is a reactive emulsifier and is capable of improving the stability of polymer dispersions and thereby improving the properties of the polymer films to be obtained.

BACKGROUND ART

Anionic surfactants such as soaps, sodium dodecylbenzenesulfonate, polyoxyethylene alkylphenyl ether sulfuric acid ester salts, and polyoxyethylene alkyl ether sulfuric acid ester salts and nonionic surfactants such as polyoxyethylene nonylphenyl ether and polyoxyethylene alkyl ethers have hitherto been utilized as emulsifiers for emulsion polymerization. However, polymer films obtained from polymer dispersions which are produced by using these emulsifiers have problems in that the films are poor in water resistance and adhesive holding power because the emulsifiers used remain in a free state in the polymer films. As an improvement method for the above problems, many reactive emulsifiers having a copolymerizable unsaturated group have been proposed (for example, patent documents 1 to 3).

Reactive emulsifiers having an acrylic group or methacrylic group as a copolymerizable unsaturated group have been proposed in conventional techniques.

However, these emulsifiers have a problem in that the emulsifiers impair polymerization stability during emulsion polymerization although they are excellent in terms of copolymerizability with monomers. For example, the emulsifiers have problems in that agglomerates are formed in an increased amount during the emulsion polymerization and that the particles yielded are coarse and have poor stability over time. With respect to reactive emulsifiers having an allyl group as a copolymerizable unsaturated group, there are cases where the reactive emulsifiers are poor in copolymerizability with monomers, depending on the kinds of monomers and polymerization conditions, and there are unsolved problems in that polymer films having fully satisfactory water resistance and adhesive holding power are not obtained from the polymer dispersion and that the foaming of the polymer dispersion causes process troubles. These problems frequently arise especially in the case where the monomers being polymerized by emulsion polymerization include styrene, and in the commercial production, there is a strong desire for improving these problems.

PRIOR-ART DOCUMENTS

Patent Documents

Patent Document 1: JP-A-S63-183998
Patent Document 2: JP-A-S63-319035
Patent Document 3: JP-A-H04-50204

SUMMARY OF THE INVENTION

Problems to be Solved by the Invention

The present invention has been achieved in view of the actual circumstances described above. An object thereof is to provide a reactive emulsifier for emulsion polymerization which makes polymerization stability during emulsion polymerization satisfactory and is capable of remarkably improving various properties, including water resistance, adhesive holding power, heat resistance, and weatherability, of polymer films to be obtained from the polymer dispersion resulting from the polymerization. Furthermore, a subject for the present invention is to provide a reactive emulsifier for emulsion polymerization with which various properties of the polymer dispersion to be obtained can be remarkably improved even in the case where styrene is included in the monomers, under the situation where the inclusion of styrene is problematic especially in commercial production.

Means for Solving the Problems

In order to solve the above problems, the emulsifier of the present invention for emulsion polymerization comprises a compound represented by the following formula (I).

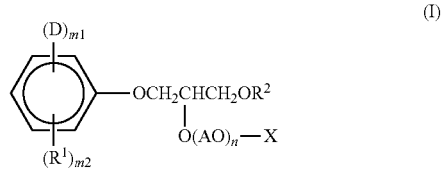

(I)

In the formula (I), D represents a polymerizable unsaturated group represented by either the following chemical formula D-1 or chemical formula D-2; m1 represents a number of 1 or larger; $R^1$ represents an alkyl group having 1-12 carbon atoms; m2 represents a number of 0 to 4; and the sum of m1 and m2 is 1 to 5. $R^2$ represents a hydrocarbon group having 6-30 carbon atoms; A represents either an alkylene group or a substituted alkylene group which has 2 to 4 carbon atoms; and n, which indicates the average number of moles of the alkylene oxide that has added, is in the range of 0 to 1,000.

X represents a hydrogen atom or an anionic hydrophilic group represented by any of $-(CH_2)_a-SO_3M$, $-(CH_2)_b-COOM$, $-PO_3M_2$, $-P(Z)O_2M$, and $-CO-CH_2-CH(SO_3M)-COOM$ (in the formulae, a and b each represent a number of 0 to 4; Z is the residue formed by removing X from the formula (I); and each M represents a hydrogen atom, an alkali metal atom, an alkaline earth metal atom, an ammonium residue, or an alkanolamine residue).

(Chemical formula D-1)

(Chemical formula D-2)

In the chemical formula D-1 and the chemical formula D-2, $R^3$ represents a hydrogen atom or a methyl group.

In the compound represented by the formula (I), it is possible that $R^2$ represents one or more members selected from alkyl groups having 6 to 22 carbon atoms and alkenyl groups having 6 to 22 carbon atoms; m1 represents a number of 1 to 2; m2 is 0; and D is located at an ortho position.

In the compound represented by the formula (I), it is possible that $R^2$ represents an aralkylaryl group represented by the following formula (II); Y is a group selected from the structures shown below; m1 represents a number of 1 to 2; m2 is 0; and D is located at an ortho position.

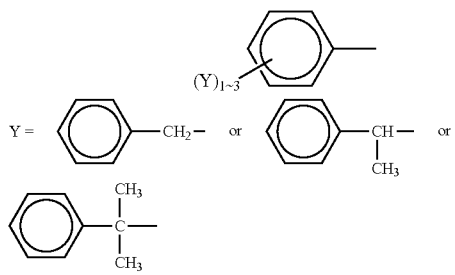

(II)

In the compound represented by the formula (I), it is possible that X represents a hydrogen atom or —SO$_3$M (wherein M represents a hydrogen atom, an alkali metal atom, an alkaline earth metal atom, an ammonium residue, or an alkanolamine residue); A represents the alkylene group having 2 carbon atoms; m1 is the number of 1; m2 is the number of 0; and D represents the chemical formula D-1 and is located at an ortho position.

MODES FOR CARRYING OUT THE INVENTION

Embodiments of the present invention are explained below.
The emulsifier for emulsion polymerization of the present invention includes a compound represented by the following formula (I), as described above.

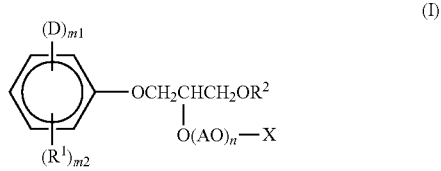

(I)

D in the formula (I) represents a polymerizable unsaturated group represented by the following chemical formula D-1 or chemical formula D-2, and R$^3$ represents a hydrogen atom or a methyl group.

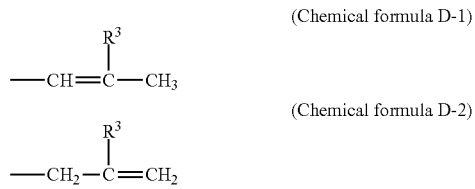

Consequently, D specifically represents a 1-propenyl group, 2-methyl-1-propenyl group, allyl group or methallyl group. As the D moieties, any one of 1-propenyl, 2-methyl-1-propenyl, allyl and methallyl, may be present alone or a mixture of these groups may be present. However, it is preferable that D is 1-propenyl.

Additionally, m1 which indicates the number of substituents D, is a number of 1 or larger, and it is preferable that m1 is a number of 1 to 2 and it is more preferable m1 is 1. The sum of this m1, indicating the number of substituents D, and m2, indicating the number of substituents R$^1$, is 1-5. It is preferable that the position of each substituent D should be an ortho position (2-position or 6-position).

R$^1$ in the formula (I) is a hydrogen atom or an alkyl group having 1 to 12 carbon atoms. Examples of the alkyl group having 1 to 12 carbon atoms include methyl, ethyl, propyl, butyl, pentyl, hexyl, heptyl, octyl, nonyl, decyl, undecyl, dodecyl, tridecyl, tetradecyl, hesisadecyl, stearyl, icosyl, docosyl, tetracosyl, and triacontyl etc. Examples of the branched alkyl group include isopropyl, isobutyl, secondary butyl, tertiary butyl, isopentyl, secondary pentyl, neopentyl, tertiary pentyl, secondary hexyl, secondary heptyl, isoheptyl, 2-ethylhexyl, secondary octyl, isononyl, secondary nonyl, isodecyl, secondary decyl, secondary undecyl, and secondary dodecyl etc. In the present invention, it is more preferable that R$^1$ is a hydrogen atom.

R$^2$ in the formula (I) is a hydrocarbon group having 6 to 30 carbon atoms, and examples thereof include a linear alkyl group, branched alkyl group, alkenyl group, aryl group, alkylaryl group, or aralkylaryl group. Examples of the linear alkyl group include methyl, ethyl, propyl, butyl, pentyl, hexyl, heptyl, octyl, nonyl, decyl, undecyl, dodecyl, tridecyl, tetradecyl, hesisadecyl, stearyl, icosyl, docosyl, tetracosyl, and triacontyl etc. Examples of the branched alkyl group include isopropyl, isobutyl, secondary butyl, tertiary butyl, isopentyl, secondary pentyl, neopentyl, tertiary pentyl, secondary hexyl, secondary heptyl, isoheptyl, secondary octyl, isononyl, secondary nonyl, isodecyl, secondary decyl, isoundecyl, secondary undecyl, secondary dodecyl, isotridecyl, secondary tridecyl, isotetradecyl, secondary tetradecyl, isopentadecyl, and secondary pentadecyl etc. Examples of the alkenyl group include octenyl, nonenyl, decenyl, undecenyl, dodecenyl, tridecenyl, tetradecenyl, pentadecenyl, hexadecenyl, heptadecenyl, and octadecenyl etc. Examples of the aryl group include phenyl, benzyl, phenylethyl, phenylpropyl, naphthylmethyl, and naphthylethyl. Examples of the alkylaryl group include monobutylphenyl, dibutylphenyl, sec-butylphenyl, di-sec-butylphenyl, tert-butylphenyl, octylphenyl, nonylphenyl, dinonylphenyl, dodecylphenyl, and didecylphenyl. Examples of the aralkylaryl group include any one of mono-, di-, and tri- of styrenated phenyls, benzylphenyls, and cumylphenyls or a mixture of these.

Among those examples, preferable examples of the hydrophobic-group skeleton which are suitable as R$^2$ include alkyl groups having 6 to 22 carbon atoms and alkenyl groups having 6 to 22 carbon atoms, and two or more of these can be used in combination. As a starting material alcohol, a commercial higher alcohol derived from a synthetic product or derived from natural resources can be suitably used. Among industrially produced alcohols are, for example, a branched saturated primary alcohol produced by the oxo process via a higher olefin induced from propylene or butane or from a mixture of these. For example, isononanol, isodecanol, isoundecanol, isododecanol, isotridecanol, and the like are suitable. In addition, EXXAL series, which is mixtures of these and manufactured by Exxon Mobil Corp., is also starting material higher alcohols which can be suitably used.

Furthermore, Guerbet alcohols obtained by alcohol dimerization by the Guerbet reaction include 2-ethyl-1-hexanol, 2-butyl-1-hexanol, 2-ethyl-1-heptanol, 2-propyl-1-octanol, 2-propyl-1-heptanol, 4-methyl-2-propyl-1-hexanol, 2-propyl-5-methyl-1-hexanol, and the like. Furthermore, "Fineoxocol" series, manufactured by Nissan Chemical Industries, Ltd., "Hisocol" series, manufactured by Itoh Oil Mfg. Co., Ltd., and the like are starting material higher alcohols which can be suitably used.

Moreover, there are Neodol series, manufactured by Shell Co., Ltd., and Safol series and Lial series, both manufactured by Sasol Ltd., as linear/branched alcohol mixtures produced by the oxo process via olefins induced from n-paraffins or ethylene oligomers. Furthermore, examples of suitable higher alcohols derived from natural resources include lauryl alcohol, myristyl alcohol, cetyl alcohol, stearyl alcohol, and oleyl alcohol. It is also possible to use a mixture of two or more of these various alcohols.

An aralkylaryl group represented by the following formula (II) also is a suitable example of the hydrophobic group skeleton as $R^2$. In formula (II), Y is selected from the structures shown below. Examples of the aralkylaryl group represented by formula (II) include a styrenated phenyl group, benzylphenyl group, and cumylphenyl group.

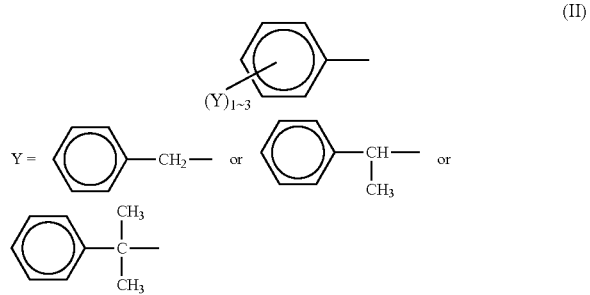

The (AO)n chain portion in the formula (I) can be obtained by selecting one or more of ethylene oxide, propylene oxide, butylenes oxide, and tetrahydrofuran (1,4-butylene oxide), as an alkylene oxide having 2 to 4 carbon atoms, and subjecting the alkylene oxide(s) to addition polymerization. Modes of polymerization of such alkylene oxides or the like to be caused to add are not limited, and the chain portion may be a homopolymer of one alkylene oxide, a random copolymer or block copolymer of two or more alkylene oxides, or a combination of such a random adduct and a block copolymer.

As the alkylene oxide, an oxyethylene group is especially preferable. In the case of selecting two or more alkylene oxides, it is preferable to select ethylene oxide as one of these. The (AO)n chain portion is a (poly)oxyalkylene chain which includes one or more oxyethylene groups in an amount of preferably 50 to 100% by mole, more preferably 70 to 100% by mole.

The degree of polymerization n indicates the average number of moles of the added alkylene oxide, and is a number in the range of 0 to 1,000, preferably in the range of 0 to 100. More specifically, in the case where X in the formula (I) is a hydrogen atom, it is preferable that the degree of polymerization n is a number in the range of 10 to 50. In the case where X is an ionic hydrophilic group, it is preferable that the degree of polymerization n is a number in the range of 0-50; and it is more preferable that n is a number in the range of 3-30.

In the emulsifier for emulsion polymerization of the present invention, which is represented by the formula (I), the content of each oxyethylene group in the (AO)n chain and the degree of polymerization n thereof make it possible to change the degree of hydrophilicity or hydrophobicity of the emulsifier. It is preferable that the composition of the chain portion represented by (AO)n should be suitably designed in accordance with the properties of the polymer dispersion which the present invention is intended to obtain and the properties of polymer films or in accordance with the monomers to be used or with applications.

Next, X in the formula (I) is a hydrogen atom, an anionic hydrophilic group represented by $-(CH_2)_a-SO_3M$, $-(CH_2)_b-COOM$, $-PO_3M_2$, $-P(Z)O_2M$, or $-CO-CH_2-CH(SO_3M)-COOM$ (in the formulae, a and b each represent a number of 0 to 4, and Z is the residue formed by removing X from the formula (I)), etc. In the formulae (I) representing anionic hydrophilic groups, M represents a hydrogen atom, an alkali metal atom such as lithium, sodium, or potassium, an alkaline earth metal atom such as magnesium or calcium, or an ammonium or alkanolamine residue. Examples of the ammonium include the ammonium of ammonia or the ammonium of an alkylamine, e.g., monomethylamine or dipropylamine etc. Examples of the alkanolamine residue include a monoethanolamine residue, diethanolamine residue, and triethanolamine residue etc. Among these anionic hydrophilic groups, preferable groups are those represented by $-SO_3M$, $-PO_3M_2$, or $-P(Z)O_2M$. In this connection, the $-PO_3M_2$ represents a monoester with the residue Z formed by removing X from the formula (I), while the $-P(Z)O_2M$ represents a diester with the residue Z formed by removing X from the formula (I). As stated above, any of these groups can be used alone in the present invention, or a mixture thereof also can be used in the present invention.

A series of steps of a process for producing the emulsifier for emulsion polymerization of the present invention is explained below in detail.

The polymerizable unsaturated group represented by D in the formula (I) is a 1-propenyl group, 2-methyl-1-propenyl group, allyl group or methallyl group as described above. Of these, allyl group or methallyl group is introduced by the allyl or methallyl introduction reaction of an (alkyl)phenol. On the other hand, the compound having a 1-propenyl group or 2-methyl-1-propenyl group can be introduced by the allyl or methallyl introduction reaction of an (alkyl)phenol and subsequent conversion into 1-propenyl group or 2-methyl-1-propenyl group in the presence of an alkali. With respect to introduction of a 1-propenyl group into phenol, although there is the following method as an example, the present invention is not construed as being limited to the following method. Namely, an allyl halide and phenol are reacted with each other together with a basic substance such as sodium hydroxide or potassium hydroxide and the resultant mixture is further heated to about 100° C., by which an allylphenol is obtained. By adjusting the amounts of the allyl halide and basic substance in this stage, a mono-allyl-substituted phenol, a di-allyl-substituted phenol, etc. can be obtained. This reaction is explained below in more detail with using formulae. An allylphenol is obtained in accordance with the following reaction schemes (i) and (ii).

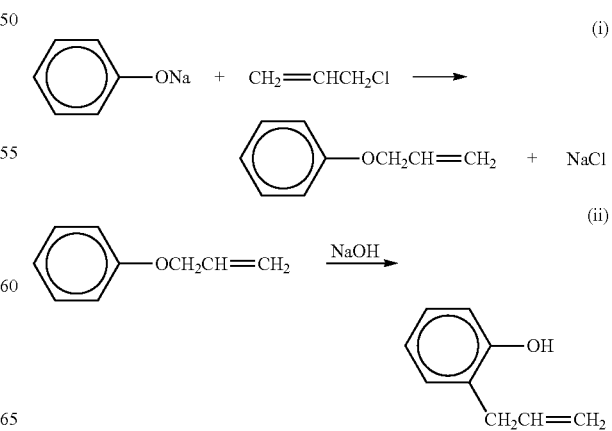

In addition, the reactions shown by the following reaction schemes (iii) and (iv) proceed depending on reaction conditions including the feed ratio between the phenol and the allyl halide, the amount of the catalyst, and reaction temperature.

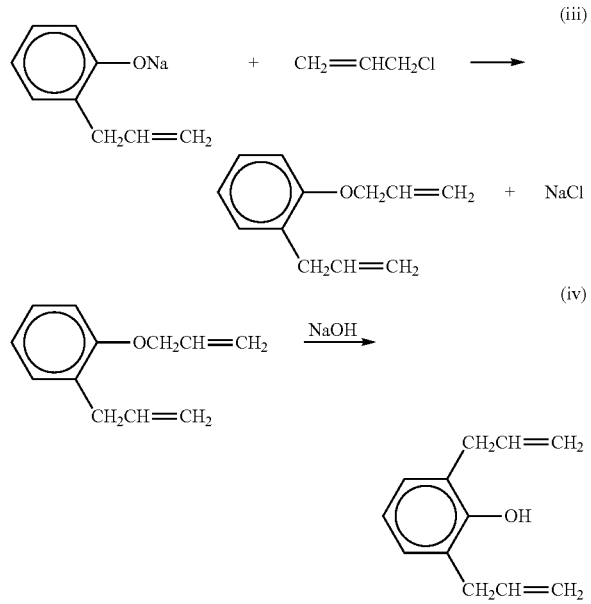

Thus, according to the reaction schemes (i) to (iv), a reaction composition which contains the desired (mono)-allyl form and further contains a di-allyl form can be obtained. This reaction composition is heated in the presence of an alkali hydroxide, thereby converting the allyl groups into 1-propenyl groups to obtain propenylphenols as major desired compounds. However, according to the reaction conditions, a composition containing a given amount of the allylphenols that have not undergone the conversion can be obtained.

The allylphenol obtained in accordance with reaction scheme (ii) is taken as an example to explain the succeeding steps below. Methods for glycidyl-etherifying the terminal hydroxyl group of the allylphenol obtained are not particularly limited, and known methods can be utilized. For example, epichlorohydrin is reacted therewith in the presence of an acid catalyst to obtain a chlorohydrin compound, which is then caused to undergo cyclization by means of an alkali, by which an allylphenyl glycidyl ether is obtained. Subsequently, 1 mol of this intermediate is caused to undergo, in the presence of a catalyst, an addition reaction with a hydrophobic starting material having an alcoholic OH group or phenolic OH group. Furthermore, a given amount of an alkylene oxide is caused to add thereto by a known method. Thus, a nonionic emulsifier for emulsion polymerization which is represented by the formula (I) according to the present invention wherein D is a 1-propenyl group, m1 is 1, m2 is 0, and X is a hydrogen atom is obtained and which is one of the desired products.

In the case where X in the formula (I) is an ionic hydrophilic group, a reaction for further introducing the ionic hydrophilic group into the compound obtained by the method described above is conducted. Reaction conditions for introducing the anionic hydrophilic group represented by —$(CH_2)_a$—$SO_3M$ wherein a is 0, among the formulae representing ionic hydrophilic groups, are not particularly limited. For example, the desired compound can be produced by reacting sulfamic acid, sulfuric acid, sulfuric anhydride, fuming sulfuric acid, chlorosulfonic acid, or the like. Reaction conditions for introducing the anionic hydrophilic group represented by —$(CH_2)_a$—$SO_3M$ wherein a is a number of 1-4 are also not particularly limited, and the desired compound can be produced, for example, by reacting propanesultone, butanesultone, or the like.

Reaction conditions for introducing the anionic hydrophilic group represented by —$(CH_2)_b$—COOM, among the formulae representing ionic hydrophilic groups, are also not particularly limited. For example, the desired compound can be produced by oxidizing the hydroxyl group, or by reacting a monohalogenoacetic acid to conduct carboxylation, or by reacting acrylonitrile or an acrylic acid ester and conducting saponification with an alkali.

Reaction conditions for introducing the anionic hydrophilic group(s) represented by —$PO_3M_2$ and/or —$P(Z)O_2M$ (wherein Z is the residue formed by removing X from the formula (I)), among the formulae representing ionic hydrophilic groups, are also not particularly limited. For example, the desired compound(s) can be produced by reacting diphosphorus pentoxide, polyphosphoric acid, orthophosphoric acid, phosphorus oxychloride, or the like. In the case of introducing phosphoric acid ester groups as anionic hydrophilic groups, a monoester type compound and a diester type compound are obtained as a mixture thereof depending on the production conditions. These compounds may be separated from each other, or this mixture may be used as such. It is also possible to conduct the reaction in the presence of water to enable the reaction product to be used in the state of having an increased monoester compound content.

Reaction conditions for introducing the anionic group represented by —CO—$CH_2$—CH($SO_3M$)-COOM, among the formulae representing ionic hydrophilic groups, are also not particularly limited. For example, the desired compound can be produced by reacting maleic anhydride to conduct monoesterification and reacting anhydrous sodium sulfite to conduct sulfonation. In the case where anionic hydrophilicity has been imparted, the compound may be thereafter neutralized with an alkali such as sodium hydroxide or potassium hydroxide, ammonia, an alkylamine, an alkanolamine such as monoethanolamine or diethanolamine, etc.

[Monomers for Emulsion Polymerization]

Monomers which are applicable to emulsion polymerization in which the emulsifier for emulsion polymerization of the present invention is used are not particularly limited, and the emulsifier can be applied to various monomers. For example, the emulsifier can be used for producing acrylate-based emulsions, styrene-based emulsions, vinyl acetate-based emulsions, SBR (styrene/butadiene) emulsions, ABS (acrylonitrile/butadiene/styrene) emulsions, BR (butadiene) emulsions, IR (isoprene) emulsions, NBR (acrylonitrile/butadiene) emulsions, etc. It is also possible to polymerize two or more monomers by the emulsion polymerization.

Examples of monomers for constituting the acrylate-based emulsions include one or more (meth)acrylic acids esters), (meth)acrylic acid (ester)/styrene, (meth)acrylic acid ester)/ vinyl acetate, (meth)acrylic acid ester)/acrylonitrile, (meth) acrylic acid (ester)/butadiene, (meth)acrylic acid (ester)/vinylidene chloride, (meth)acrylic acid (ester)/allylamine, (meth)acrylic acid (ester)/vinylbyridine, (meth)acrylic acid (ester)/(meth)acrylic acid alkylolamide, (meth)acrylic acid (ester)/N,N-dimethylaminoethyl (meth)acrylate, and (meth) acrylic acid (ester)/N,N-diethylaminoethyl vinyl ether.

Besides styrene alone, examples of monomers for the styrene-based emulsions include styrene/acrylonitrile, styrene/butadiene, styrene/fumaronitnole, styrene/maleonitrile, styrene/cyanoacrylic acid ester, styrene/phenylvinyl acetate, styrene/chloromethylstyrene, styrene/dichlorostyrene, styrene/vinylcarbazole, styrene/N,N-diphenylacrylamide, styrene/methyl styrene, acrylonitrile/butadiene/styrene, styrene/acrylonitrile/methyl styrene, styrene/acrylonitrile/vinylcarbazole, and styrene/maleic acid.

Besides vinyl acetate alone, examples of monomers for the vinyl acetate-based emulsions include vinyl acetate/styrene, vinyl acetate/vinyl chloride, vinyl acetate/acrylonitrile, vinyl acetate/maleic acid (ester), vinyl acetate/fumaric acid (ester), vinyl acetate/ethylene, vinyl acetate/propylene, vinyl acetate/isobutylene, vinyl acetate/vinylidene chloride, vinyl acetate/cyclopentadiene, vinyl acetate/crotonic acid, vinyl acetate/acrolein, and vinyl acetate/alkyl vinyl ether.

Examples of monomers to be subjected to polymerization for halogenoolefin-based systems include vinyl chloride, vinylidene chloride, vinyl chloride/maleic acid (ester), vinyl chloride/fumaric acid (ester), vinyl chloride/vinyl acetate, vinyl chloride/vinylidene chloride, vinylidene chloride/vinyl acetate, and vinylidene chloride/vinyl benzoate.

[Emulsion Polymerization Conditions]

Polymerization initiators which are usable in emulsion polymerization reactions in which the emulsifier for emulsion polymerization of the present invention is used are not particularly limited. For example, use can be made of hydrogen peroxide, ammonium persulfate, potassium persulfate, azobisisobutyronitrile, benzoyl peroxide, or the like. As a polymerization accelerator, sodium hydrogen sulfite, ammonium ferrous sulfate, or the like can be used. As a chain transfer agent, α-methylstyrene dimer, a mercaptan such as n-butyl mercaptan or t-dodecyl mercaptan, a halogenated hydrocarbon such as carbon tetrachloride or carbon tetrabromide, or the like can be used.

Usually, the adequate amount of the emulsifier of the present invention to be used is preferably from 0.1 to 20% by mass, more preferably from 0.2 to 10.0% by mass, based on all the monomers.

Even in the case where the emulsifier for emulsion polymerization of the present invention is used as the only emulsifier, the emulsion polymerization can be satisfactorily carried out. However, this emulsifier may be used in combination with an anionic surfactant or cationic surfactant and/or another nonionic surfactant, so long as the effects of the present invention can be maintained. Thus, polymerization stability during the emulsion polymerization improves and processability in later steps can be improved.

The anionic surfactant, cationic surfactant, and nonionic surfactant are not particularly limited. Examples of the anionic surfactant include fatty acid soaps, rosin acid soaps, alkylsulfonic acid salts, alkylarylsulfonic acid salts, alkylsulfosuccinic acid salts, polyoxyalkylene alkyl sulfate salts, and polyoxyalkylene aryl sulfate salts. Examples of the cationic surfactant include stearyltrimethylammoniums, cetyltrimethylammoniums, and lauryltrimethylammoniums. Examples of the nonionic surfactant include polyoxyalkylene alkylphenyl ethers, polyoxyalkylene alkyl ethers, alkyl polyglucosides, polyglycerin alkyl ethers, polyoxyalkylene fatty acid esters, polyglycerin fatty acid esters, and sorbitan fatty acid esters.

The amount of these surfactants to be used in combination is preferably from 0.5 to 95 parts by mass, more preferably from 5 to 60 parts by mass, even more preferably from 10 to 30 parts by mass, per 100 parts of the emulsifier for emulsion polymerization of the present invention.

A known protective colloid agent can be used in combination therewith for the purpose of improving polymerization stability during the emulsion polymerization. Usable protective colloid agents include completely saponified poly(vinyl alcohol), partly saponified poly(vinyl alcohol), hydroxyethyl cellulose, carboxymethyl cellulose, methyl cellulose, poly(acrylic acid), and gum arabic.

An another possible method of using the emulsifier for emulsion polymerization of the present invention is to add the emulsifier to a polymer which has undergone polymerization, in order to improve the stability of the polymer dispersion.

Furthermore, the emulsifier for emulsion polymerization of the present invention can be applied also to suspension polymerization.

[Effects]

The emulsifier for emulsion polymerization of the present invention has a copolymerizable unsaturated group in the hydrophobic-group portion of the molecule thereof, has excellent copolymerizability with polymerizable monomers, in particular, styrene-based monomers; and is apt to be incorporated into the polymer composition. Because of this, the emulsifier for emulsion polymerization functions as a copolymerizable reactive emulsifier, and the amount of the emulsifier present in a free state in polymer films obtained from the polymer dispersion is considerably small. The emulsifier hence exhibits a highly excellent effect in improving various properties of the films, including water resistance, adhesive holding power, heat resistance, and weatherability. In addition, the foaming and mechanical stability, etc. of the polymer dispersion are remarkably improved.

According to the present invention, it is possible to provide an emulsifier for emulsion polymerization which improves stability during emulsion polymerization and which is capable of remarkably improving various properties, including water resistance, adhesive holding power, heat resistance, and weatherability, of polymer films obtained from the polymer dispersion.

EXAMPLES

Although the present invention will be explained below in more detail by reference to Examples, the present invention should not be construed as being limited by the following Examples. Hereinafter, "parts" and "%" are by mass unless otherwise indicated.

Production Examples for Producing Compounds Represented by the Formula (I)

Production Example 1

Into a reaction vessel equipped with a stirrer, thermometer, and reflux condenser 94 g (1.0 mol) of phenol, 40 g (1.0 mol) of NaOH, and 210 g of acetone were introduced. With stirring the contents, the internal temperature was elevated to 40° C. Subsequently, 76 g (1.0 mol) of acryloyl chloride was added dropwise thereto over 1 hour. After completion of the dropwise addition, the reaction mixture was further kept at 40° C. for 2 hours and reacted thereby. The reaction product was filtered to remove the NaCl yielded as a by-product, and the acetone was thereafter removed under reduced pressure to obtain 134 g of allyl phenyl ether.

This allyl phenyl ether was introduced into an autoclave and held at 200° C. for 5 hours with stirring. In this stage, a rearrangement reaction occurred to obtain 2-allylphenol. Into a reaction vessel, 134 g (1 mol) of the 2-allylphenol and 1.3 g of a boron trifluoride ether complex as a catalyst were introduced. In a nitrogen atmosphere, the contents were heated to 100° C. with stirring, and epichlorohydrin was added dropwise thereto in an amount of 1 mol per mole of the 2-allylphenol, with stirring the contents and maintaining that temperature. Thereafter, 100 g of 48% aqueous sodium hydroxide solution was added dropwise thereto at 60° C., and the resultant mixture was aged at 60° C. for 2 hours. Subsequently, 400 g of water was added thereto, and this mixture was stirred at 80° C. for 30 minutes and then allowed to stand still at 80° C. for 1 hour. The lower layer (aqueous layer) which had separated was removed, followed by dehydration at 100° C. under vacuum to obtain 2-allylphenyl glycidyl ether.

Next, 190 g (1 mol) of the 2-allylphenyl glycidyl ether, 186 g (1 mol) of lauryl alcohol (containing at least 98% C12), and 10 g of sodium hydroxide as a catalyst were introduced into a reaction vessel equipped with a stirrer, thermometer, and nitrogen introduction tube. After replacing the atmosphere in the reactor with nitrogen, reaction for 5 hours under the conditions of a temperature of 100° C. were carried out with stirring. Thereafter, the catalyst was removed to obtain intermediate A. Subsequently, 376 g (1 mol) of this intermediate A was transferred to an autoclave, and 440 g (10 mol) of ethylene oxide was added thereto under the conditions of a pressure of 1.5 kg/cm$^2$ and a temperature of 130° C. with using potassium hydroxide as a catalyst. Thus, a compound (invention product 1) represented by the formula (I) was obtained. During this reaction, the allyl group changed into a 1-propenyl group quantitatively.

Production Example 2

A compound (invention product 2) represented by the formula (I) was obtained in accordance with Production Example 1, except that the amount of the ethylene oxide was increased from 440 g (10 mol) to 2,200 g (50 mol).

Production Example 3

Into a reaction vessel equipped with a stirrer, thermometer, and nitrogen introduction tube, 816 g (1 mol) of the compound (invention product 1) obtained in Production Example 1 was introduced. After replacing the atmosphere in the reactor with nitrogen, 97 g (1 mol) of sulfamic acid was reacted therewith under the conditions of a temperature of 120° C. Thereafter, the reaction product was purified to obtain a compound (invention product 3) represented by the formula (I).

Production Example 4

Into a reaction vessel equipped with a stirrer and a thermometer, 816 g (1 mol) of the compound (invention product 1) obtained in Production Example 1 was introduced. Subsequently, 128 g (1.1 mol) of sodium monochloroacetate and 44 g (1.1 mol) of sodium hydroxide were introduced over 3 hours into the reaction vessel which was kept at 40° C., with stirring. Thereafter, the mixture was reacted for 17 hours with stirring at 40° C. The resultant reaction product was purified to obtain a compound (invention product 4) represented by the formula (I).

Production Example 5

Into a reaction vessel equipped with a stirrer, thermometer, and nitrogen introduction tube 190 g (1 mol) of 2-allylphenyl glycidyl ether, 200 g (1 mol) of isotridecyl alcohol, and 10 g of sodium hydroxide as a catalyst were introduced. After replacing the atmosphere in the reactor with nitrogen, the contents were stirred and reacted for 5 hours under the conditions of a temperature of 100° C. Thereafter, the catalyst was removed to obtain intermediate B. Subsequently, 390 g (1 mol) of this intermediate B was transferred to an autoclave, and 440 g (10 mol) of ethylene oxide was added thereto under the conditions of a pressure of 1.5 kg/cm$^2$ and a temperature of 130° C. with using potassium hydroxide as a catalyst. During this reaction, the allyl group changed into a 1-propenyl group quantitatively. Furthermore, 830 g (1 mol) of this ethylene oxide adduct and 94 g (0.33 mol) of phosphoric anhydride were introduced, and phosphorylation was conducted at 80° C. for 5 hours with stirring. Thereafter, the resultant mixture was neutralized with caustic soda to obtain a compound (invention product 5) represented by the formula (I). This composition was examined by NMR and, as a result, the monoester/diester ratio thereof was found to be 56/44.

Production Example 6

Into a reaction vessel equipped with a stirrer, thermometer, and nitrogen introduction tube, 190 g (1 mol) of 2-allylphenyl glycidyl ether, 130 g (1 mol) of 2-ethylhexyl alcohol, and 10 g of sodium hydroxide as a catalyst were introduced. After replacing the atmosphere in the reactor with nitrogen, the contents were stirred and reacted for 5 hours under the conditions of a temperature of 100° C. Thereafter, the catalyst was removed to obtain intermediate C. Subsequently, 320 g (1 mol) of this intermediate C was transferred to an autoclave, and 175 g (3 mol) of propylene oxide and 440 g (10 mol) of ethylene oxide were successively caused to add thereto under the conditions of a pressure of 1.5 kg/cm$^2$ and a temperature of 130° C. with using potassium hydroxide as a catalyst. During this reaction, the allyl group changed into a 1-propenyl group quantitatively. Furthermore, 934 g (1 mol) of this block adduct of propylene oxide and ethylene oxide was introduced into a reaction vessel equipped with a stirrer, thermometer, and nitrogen introduction tube. After replacing the atmosphere in the reactor with nitrogen, 97 g (1 mol) of sulfamic acid was reacted therewith under the conditions of a temperature of 120° C.

Thereafter, the reaction product was purified to obtain a compound (invention product 6) represented by the formula (I).

Production Example 7

A compound (invention product 7) represented by the formula (I) was obtained in accordance with Production Example 1 and Production Example 3, except that isodecyl alcohol was used in place of the lauryl alcohol.

Production Example 8

A compound (invention product 8) represented by the formula (I) was obtained in accordance with Production Example 1 and Production Example 3, except that phenol was used in place of the lauryl alcohol and that the amount of the ethylene oxide was increased from 440 g (10 mol) to 880 g (20 mol).

Production Example 9

A compound (invention product 9) represented by the formula (I) was obtained in accordance with Production Example 1 and Production Example 3, except that styrenated phenols (mono-styrenated form/di-styrenated form/tri-styrenated form=15/50/35 by mass) were used in place of the lauryl alcohol.

Production Example 10

A compound (invention product 10) represented by the formula (I) was obtained in accordance with Production Example 1 and Production Example 3, except that the temperature during the addition reaction of ethylene oxide was changed from 130° C. to 115° C. During this reaction, the allyl group changed into a 1-propenyl group at a conversion of 80%.

Production Example 11

A compound (invention product 11) represented by the formula (I) was obtained in accordance with Production Example 1 and Production Example 3, except that the amount of the allyl chloride was increased from 76 g (1 mol) to 91 g (1.2 mol).

Production Example 12

Into a reaction vessel equipped with a stirrer, thermometer, and a nitrogen introduction tube, 376 g (1 mol) of the intermediate (A) described above was introduced. After replacing the atmosphere in the reactor with nitrogen, 97 g (1 mol) of sulfamic acid was reacted therewith under the conditions of a temperature of 120° C. Thereafter, the reaction product was purified to obtain a compound (invention product 12) represented by the formula (I).

Production Example 13

A compound (invention product 13) represented by the formula (I) was obtained in accordance with Production Example 1 and Production Example 4, except that 4-methylphenol was used in place of the phenol and that the amount of the ethylene oxide was increased from 440 g (10 mol) to 1,320 g (30 mol).

The structures of the compounds represented by the formula (I) which were obtained in the Production Examples given above are as follows. In the structural formulae, EO represents an oxyethylene group and PO represents an oxypropylene group.

Invention product 1

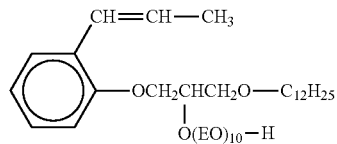

Invention product 2

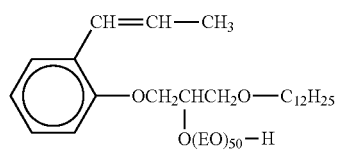

Invention product 3

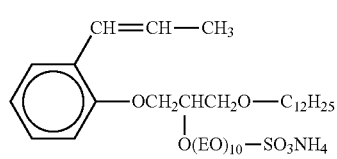

Invention product 4

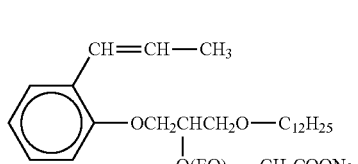

Invention product 5

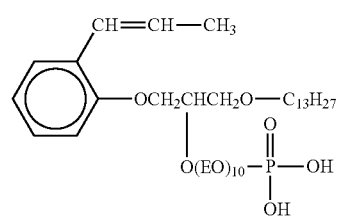

Invention product 6

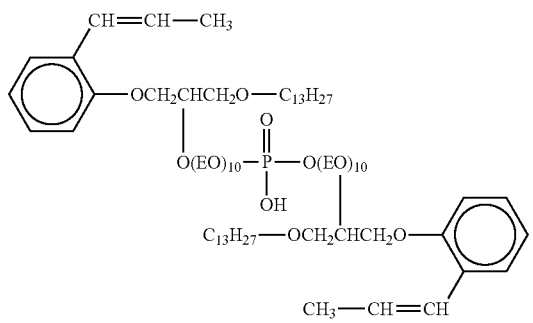

Invention product 7

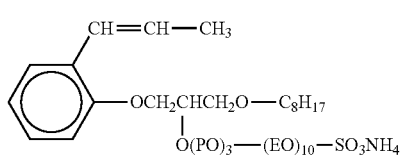

Invention product 8

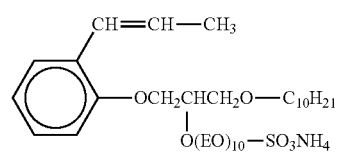

Invention product 9

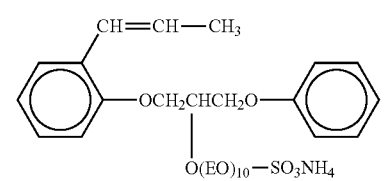

Invention product 10

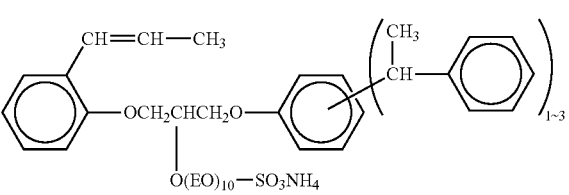

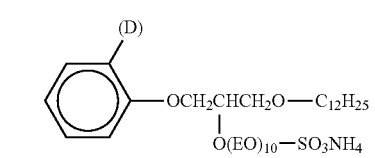

In the structural formula, D represents 1-propenyl and allyl, wherein the 1-propenyl/allyl ratio is 80/20.

Invention product 11

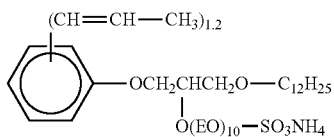

Invention product 12

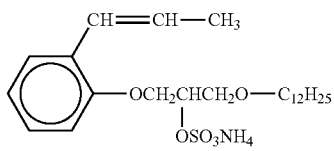

Invention product 13

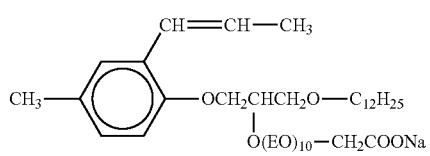

The comparative products used in the following Use Examples are as follows.

Comparative product 1

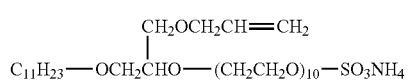

Comparative product 2

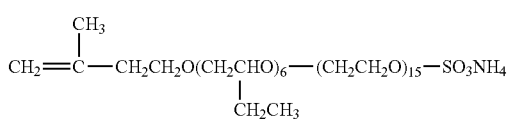

Comparative product 3

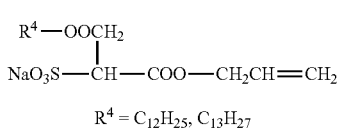

$R^4 = C_{12}H_{25}, C_{13}H_{27}$

Comparative product 4

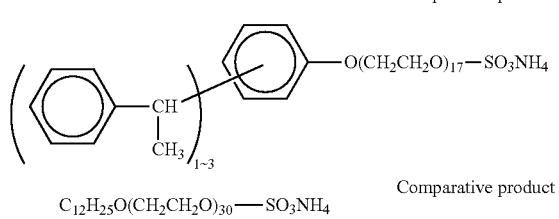

Comparative product 5

$C_{12}H_{25}O(CH_2CH_2O)_{30}$—$SO_3NH_4$

Use Examples of Emulsifiers for Emulsion Polymerization

Use Example 1

Preparation of Styrene/Butyl Acrylate Polymer Dispersions

With using a homomixer, 123.75 g of styrene, 123.75 g of butyl acrylate, and 2.5 g of acrylic acid as monomers were mixed together with 5.0 g of an emulsifier which was an invention product or a comparative product and with 105 g of an ion-exchanged water to prepare a mixed-monomer emulsion. Separately therefrom, 122 g of ion-exchanged water and 0.25 g of sodium hydrogen carbonate were introduced into a reaction vessel equipped with a stirrer, reflux condenser, thermometer, nitrogen introduction tube, and dropping funnel. A 36 g portion of the mixed-monomer emulsion prepared beforehand was placed in the dropping funnel and introduced en bloc into the reaction vessel, and the resultant mixture was heated to 80° C. Thereafter, the mixture was continuously stirred for 15 minutes, and 0.5 g of ammonium persulfate as a polymerization initiator in 20 g of ion-exchanged water was then added thereto to initiate polymerization. Subsequently, after 15 minutes from addition of the polymerization initiator, the remaining 324 parts of the mixed-monomer emulsion was added dropwise over 3 hours and polymerized. Furthermore, the reaction mixture was successively aged for 2 hours and then cooled, and the pH thereof was adjusted to 8 with ammonia water. Thus, polymer dispersions to be subjected to evaluation tests according to the present invention were obtained. The polymer dispersions obtained and polymer films thereof were subjected to the following evaluation tests. The detailed results thereof are shown in Table 1.

(1) Evaluation of Polymer Dispersions

The polymer dispersions obtained in Use Example 1 and Use Example 2 were subjected to the following evaluation tests.

[Polymerization Stability]

Each polymer dispersion was filtered with a 80-mesh metal screen to take out agglomerates which had formed during the emulsion polymerization step, and the filtration residue was washed with water and then dried at 105° C. for 2 hours. The mass thereof is shown in terms of % by mass based on the solid components of the dispersion. In this connection, the smaller the amount of the agglomerates in this measurement is, the higher the polymerization stability during the emulsion polymerization step becomes.

[Average Particle Size]

Part of each polymer dispersion was taken out and examined for particle size with a particle size distribution analyzer of the dynamic light-scattering type (product name, MICROTRAC UPA9340, manufactured by Nikkiso Co., Ltd.).

[Conversion Ratio of Reactive Emulsifier (%)]

A given amount of each dispersion was weighed out, and excess methanol was added thereto to coagulate the polymer. Thereafter, the mixture was centrifuged. Subsequently, the supernatant was recovered and distilled under vacuum. The resultant residue was examined by $^1$H-NMR to determine the conversion ratio of emulsifier (%).

[Mechanical Stability]

A 50 g portion of each polymer dispersion was taken out and treated with a Maron type tester at a load of 10 kg and a rotation speed of 1,000 rpm for 5 minutes. The agglomerates which had formed were taken out by filtration with a 80-mesh metal screen, and the residue was washed with water and then dried at 105° C. for 2 hours. The mass thereof is shown in terms of % by mass based on the solid components of the dispersion. In this connection, the smaller the amount of the agglomerates in this measurement is, the more the polymer dispersion is stable under high-shear conditions becomes.

[Foaming Property]

Polymer dispersion was diluted 2 times with water, and 30 mL of the dilution was placed in a 100-mL Nessler tube. This tube was turned upside down 30 times, subsequently allowed to stand still for 5 minutes, and then examined for the amount (mL) of the froth.

(2) Evaluation of Polymer Films

A polymer film was produced from polymer dispersion in the following manner and subjected to the following evaluation test.

[Water Whitening Resistance Test]

The polymer dispersion was applied to a commercial glass plate so as to result in a film thickness of 120 m (dry), and dried for 24 hours in an atmosphere of 20° C.×65% RH. This coated glass plate was immersed in 25° C. ion-exchanged water and placed on 16-point printed characters. The number of days required for the characters to become unable to be distinguished when the characters are viewed through the polymer film was determined. The results thereof were evaluated on the basis of the following criteria.

A: 21 days or more
B: 11 to 20 days
C: 1 to 10 days
D: less than 1 day tests according to the present invention were obtained. Obtained polymer dispersions was evaluated for solid content, polymerization stability, average particle size, conversion ratio of emulsifier (%), mechanical stability, and foaming property, and the polymer films were also evaluated for water whitening resistance property and adhesive holding power. For evaluating the polymerization stability, average particle size, conversion ratio of emulsifier (%), mechanical stability, foaming properties, and water whitening resistance properties, the same evaluation methods as described above were used. The method used for evaluating the adhesive holding power is described below. The detailed results thereof are shown in Table 2.

[Adhesive Holding Power]

Each polymer dispersion obtained in Use Example 2 was applied in a thickness of 25 μm (dry) to a PET film cut into a

TABLE 1

|  | Emulsifier | Evaluation of Polymer Dispersion ||||| Evaluation of polymer film |
|---|---|---|---|---|---|---|---|
|  |  | Polymerization stability (%) | Average particle size (μm) | Conversion ratio of emulsifier (%) | Mechanical stability (%) | Foaming property (mL) | Water whitening resistance property |
| Example 1 | Invention product 1 [1] | 0.13 | 0.27 | 95 | 0.53 | 10 | A |
| Example 2 | Invention product 2 [1] | 0.11 | 0.24 | 88 | 0.47 | 9 | A |
| Example 3 | Invention product 3 | 0.05 | 0.12 | 90 | 0.14 | 11 | A |
| Example 4 | Invention product 4 | 0.10 | 0.12 | 89 | 0.21 | 13 | A |
| Example 5 | Invention product 5 | 0.12 | 0.19 | 92 | 0.39 | 15 | A |
| Example 6 | Invention product 6 | 0.14 | 0.16 | 96 | 0.60 | 10 | A |
| Example 7 | Invention product 7 | 0.09 | 0.13 | 87 | 0.28 | 12 | A |
| Example 8 | Invention product 8 | 0.05 | 0.16 | 93 | 0.46 | 10 | A |
| Example 9 | Invention product 9 | 0.03 | 0.11 | 91 | 0.19 | 11 | A |
| Example 10 | Invention product 10 | 0.04 | 0.12 | 90 | 0.12 | 13 | A |
| Example 11 | Invention product 11 | 0.03 | 0.14 | 94 | 0.23 | 12 | A |
| Example 12 | Invention product 12 | 0.10 | 0.10 | 96 | 0.10 | 12 | A |
| Example 13 | Invention product 13 | 0.09 | 0.17 | 89 | 0.37 | 11 | A |
| Comparative Example 1 | Comparative product 1 | 0.80 | 0.26 | 45 | 1.78 | 23 | C |
| Comparative Example 2 | Comparative product 2 | 3.50 | 0.77 | 46 | 5.22 | 26 | C |
| Comparative Example 3 | Comparative product 3 | 1.00 | 0.50 | 30 | 4.10 | 41 | C |
| Comparative Example 4 | Comparative product 4 | 0.24 | 0.18 | —[2] | 0.12 | 57 | D |
| Comparative Example 5 | Comparative product 5 | 0.65 | 0.17 | —[2] | 0.33 | 62 | D |

1) Containing 20% by weight of the invention product 3.
2) Evaluation was omitted since the emulsifier was not reactive.

Use Example 2

Preparation of 2-Ethylhexyl Acrylate/Butyl Acrylate Polymer Dispersions

Emulsion polymerization was conducted in the same manner as in Use Example 1, except that the styrene among the monomer components was replaced with 2-ethylhexyl acrylate. Thus, polymer dispersions to be subjected to evaluation width of 5 cm, and was heat-treated. The resultant coated PET film was applied to an SUS plate and press-bonded thereto with a roller. The film was partly stripped off so as to result in an adhesion area of 5 cm×5 cm, and a weight of 200 g was hung down from the end of the film. The time (seconds) required for the film to peel off was measured. The results thereof were evaluated on the basis of the following criteria.

A: 900 seconds or longer
B: 300 to 900 seconds
C: shorter than 300 seconds

TABLE 2

|  | Emulsifier | Evaluation of Polymer Dispersion | | | | | Evaluation of polymer film | |
|---|---|---|---|---|---|---|---|---|
|  |  | Polymerization stability (%) | Average particle size (μm) | Conversion ratio of emulsifying agent (%) | Mechanical stability (%) | Foaming property (mL) | Water whitening Resistance property | Adhesive holding power |
| Example 14 | Invention product 2 [1] | 0.12 | 0.21 | 90 | 0.35 | 10 | A | A |
| Example 15 | Invention product 3 | <0.01 | 0.12 | 89 | 0.20 | 15 | A | A |
| Example 16 | Invention product 5 | 0.14 | 0.13 | 94 | 0.30 | 12 | A | A |
| Example 17 | Invention product 6 | 0.07 | 0.16 | 95 | 0.27 | 11 | A | A |
| Example 18 | Invention product 9 | <0.01 | 0.11 | 90 | 0.11 | 14 | A | A |
| Example 19 | Invention product 11 | 0.01 | 0.12 | 88 | 0.18 | 14 | A | A |
| Comparative Example 6 | Comparative product 1 | 0.29 | 0.20 | 70 | 0.58 | 39 | B | C |
| Comparative Example 7 | Comparative product 2 | 0.37 | 0.21 | 76 | 2.03 | 36 | C | C |
| Comparative Example 8 | Comparative product 4 | 0.10 | 0.13 | —[2] | 0.31 | 48 | D | B |

1) Containing 20% by weight of the invention product 3.
2) Evaluation was omitted since the emulsifier was not reactive.

INDUSTRIAL APPLICABILITY

The polymer dispersion obtained through addition of the emulsifier for emulsion polymerization of the present invention can be applied, for example, as a pressure-sensitive adhesive, an adhesive, a coating material, an infiltrating reinforcement, or the like to not only resins, metals, paper, wood, and fabric but also concrete, etc. Furthermore, the polymer dispersion or the solid polymer taken out of the polymer dispersion can be used as a modifier for resins, rubbers, and polymers.

While the present invention has been described in detail and with reference to specific embodiments thereof, it will be apparent to one skilled in the art that various changes and modifications can be made therein without departing from the spirit and scope thereof.

The invention claimed is:

1. An emulsifier for emulsion polymerization comprising a compound represented by formula (I):

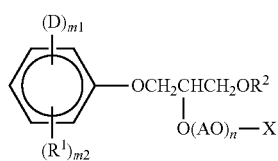

(I)

wherein

D represents a polymerizable unsaturated group represented by either formula (D-1) or formula (D-2) and wherein $R^3$ represents a hydrogen atom or a methyl group:

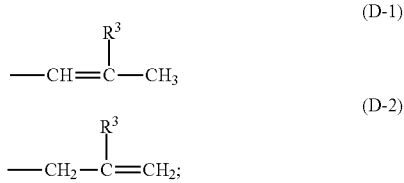

m1 is 1 to 5;
$R^1$ represents an alkyl group having 1-12 carbon atoms;
m2 is 0 to 4, and the sum of m1 and m2 is 1 to 5;
$R^2$ represents a hydrocarbon group having 6-30 carbon atoms;
A represents an alkylene group which has 2 to 4 carbon atoms;
n is 3 to 1,000; and
X represents a hydrogen atom or an anionic hydrophilic group represented by any of $-(CH_2)_a-SO_3M$, $-(CH_2)_b-COOM$, $-PO_3M_2$, $-P(Z)O_2M$, and $-CO-CH_2-CH(SO_3M)-COOM$, wherein a and b are each 0 to 4, wherein Z is the residue formed by removing X from the formula (I), and wherein each M represents a hydrogen atom, an alkali metal atom, an alkaline earth metal atom, an ammonium residue, or an alkanolamine residue.

2. The emulsifier for emulsion polymerization according to claim 1, wherein in the formula (I),
$R^2$ represents one or more members selected from alkyl groups having 6 to 22 carbon atoms and alkenyl groups having 6 to 22 carbon atoms;
m1 is 1 or 2;
m2 is 0; and
D is located at an ortho position.

3. The emulsifier for emulsion polymerization according to claim 1, wherein in the formula (I),
$R^2$ represents an aralkylaryl group represented by the following formula (II):

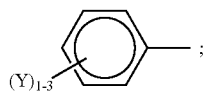   (II)

Y is a group selected from structures (IIa), (IIb), and (IIc);

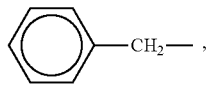   (IIa)

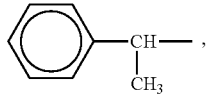   (IIb)

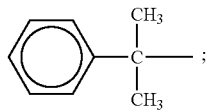   (IIc)

m1 is 1 or 2;
m2 is 0; and
D is located at an ortho position.

4. The emulsifier for emulsion polymerization according to claim 1, wherein in the formula (I), X represents a hydrogen atom or —SO$_3$M, wherein M represents a hydrogen atom, an alkali metal atom, an alkaline earth metal atom, an ammonium residue, or an alkanolamine residue;
A represents the alkylene group having 2 carbon atoms;
m1 is 1;
m2 is 0; and
D represents the formula (D-1) and is located at an ortho position.

5. The emulsifier for emulsion polymerization according to claim 2, wherein in the formula (I), X represents a hydrogen atom or —SO$_3$M, wherein M represents a hydrogen atom, an alkali metal atom, an alkaline earth metal atom, an ammonium residue, or an alkanolamine residue;
A represents the alkylene group having 2 carbon atoms;
m1 is 1;
m2 is 0; and
D represents the formula (D-1) and is located at an ortho position.

6. The emulsifier for emulsion polymerization according to claim 3, wherein in the formula (I), X represents a hydrogen atom or —SO$_3$M, wherein M represents a hydrogen atom, an alkali metal atom, an alkaline earth metal atom, an ammonium residue, or an alkanolamine residue;
A represents the alkylene group having 2 carbon atoms;
m1 is 1;
m2 is 0; and
D represents the formula (D-1) and is located at an ortho position.

* * * * *